United States Patent Office 3,251,405
Patented May 17, 1966

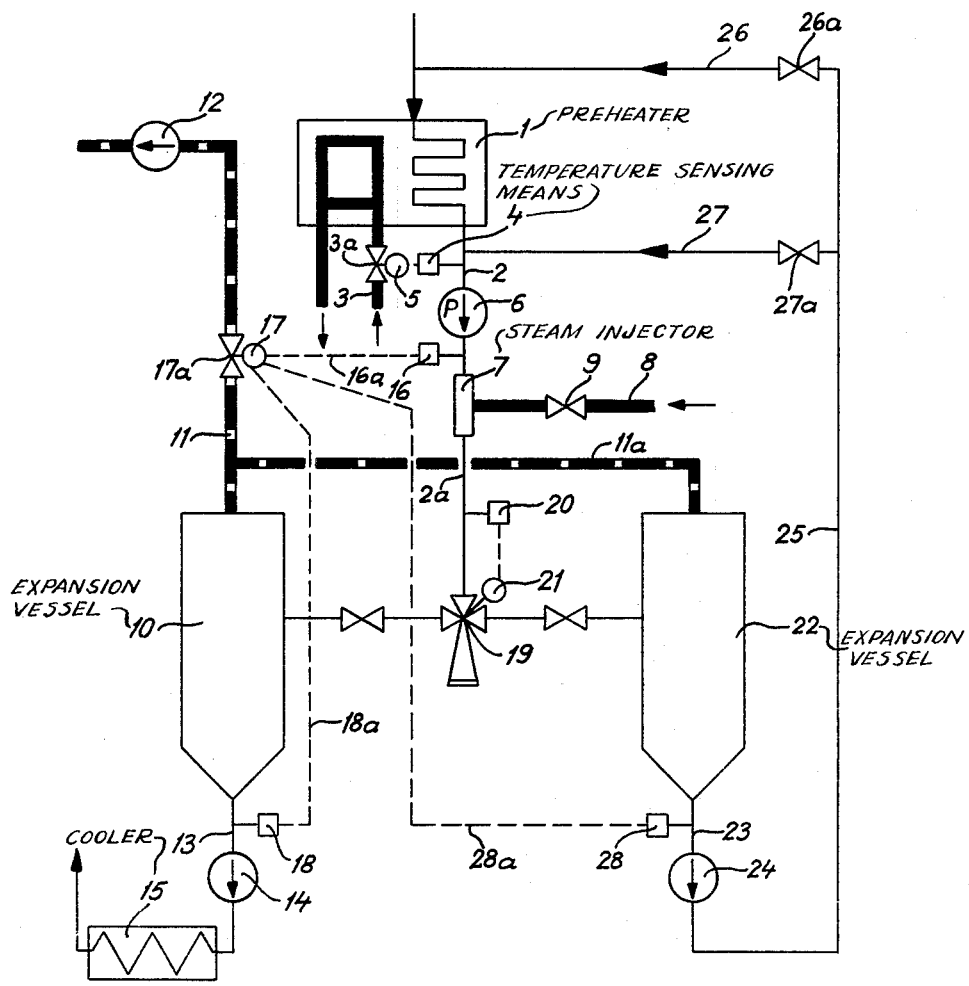

---

3,251,405
APPARATUS FOR HEAT TREATMENT OF LIQUIDS
Bengt Hilding Hallström, Lund, Sweden, assignor to Aktiebolaget Separator, Stockholm, Sweden, a corporation of Sweden
Filed Dec. 17, 1963, Ser. No. 331,259
Claims priority, application Sweden, Dec. 21, 1962, 13,919/62
2 Claims. (Cl. 165—40)

This invention relates to the heat treatment of liquids by introducing steam into the liquid and cooling the thus heated liquid by passing it into an expansion zone, where evaporation or flashing of part of the mixture of liquid and steam-condensate occurs. The invention has particular reference to an improved method and apparatus for heat treating liquids in this manner, whereby the treated liquid recovered from the evaporation zone has the same water content as the untreated liquid.

Many food products or medical products in liquid state must be sterilized by heat treatment in order to be preserved for any great length of time. However, such liquids are generally damaged or spoiled when slowly heated to and treated at temperatures of 100° C. or higher. Therefore, when the initial properties of the liquid are to be preserved as far as possible, the heat treatment has been carried out in such way that the liquid is first indirectly preheated in a heat exchanger, such as one of the plate type, whereupon it is very rapidly heated up to a predetermined sterilization temperature by direct mixing with steam or direct steam injection in a suitable heating device and finally cooled to a temperature which is innocuous for the liquid by evaporation in an exhausted expansion vessel.

During the direct steam injection or mixing, such a quantity of steam is condensed in the liquid as is required to increase, by means of its liberated heat, the temperature of the preheated liquid to the predetermined sterilization temperature. Thus, a certain quantity of condensate is supplied to the liquid so that the water content of the latter increases. In connection with the subsequent pressure drop and the evaporation occasioned by it, the liquid cools because a fraction of its latent heat is used for the formation of steam, and its water content decreases due to evaporated steam from it. The quantity of evaporated steam depends, of course, on the temperature prevailing during the evaporation and on the pressure corresponding to said temperature.

Particularly in cases where the water content is an important property of the liquid to be heat treated, it is desirable to obtain the same water content in the heat-treated liquid as in the liquid prior to its heat treatment. When the heat treatment is carried out as described above, this is achieved by withdrawing from the liquid, at the expansion zone where the evaporation is caused by the pressure drop, a quantity of water equal to that previously supplied as condensate during the steam injection or mixing.

If the same quantity of water as that which has been supplied to the liquid in form of condensate is evaporated when the pressure drop occurs, the temperature of the liquid will, however, be a few degrees higher than that of the liquid prior to the direct steam injection or mixing. The steam which is injected or mixed into the liquid is at a higher temperature and therefore contains more heat than the steam which is evaporated in the expansion vessel under vacuum. Since, as mentioned above, thse steam quantities must be identical, it is necessary that the heat content of the liquid prior to the injection and after the expansion, respectively, be inversely proportional to the heat content of the steam. This means that the temperature of the liquid should be higher after the expansion (lower heat content in the steam) than prior to the injection (higher heat content of the steam).

If, for example, milk is indirectly preheated to 75° C., thereafter heated to 140° C. by direct steam injection, and finally cooled by pressure drop during evaporation, and if the quantity of water which is withdrawn from the milk by evaporation is the same as that supplied in form of condensate by the steam injection, the computed temperature of the milk after the pressure drop will be 77.8° C.

For given values of the temperature of the liquid after the indirect heating and of the sterilization temperature, it is possible to compute or to determine by practical test the temperature to which the liquid is cooled when the quantity of evaporated steam is identical to the quantity of supplied condensate. When that temperature is known, it is possible to obtain a liquid with the same water content after the heat as it had before such treatment, by keeping constant said temperature as well as the difference between said temperature and the temperature of the liquid prior to the direct steam injection or mixing (after the indirect preheating).

According to the present invention, there is withdrawn from the liquid, by the evaporation due to the pressure drop, a quantity of water which is identical to that supplied in the form of condensate incident to the direct stream injection or mixing. The method of the invention is characterized in that the liquid is indirectly preheated to a constant temperature and that the difference between the temperature of the liquid prior to the direct steam injection or mixing and after the pressure drop during evaporation is kept at a predetermined value by controlling the pressure (the vacuum) at which the evaporation occurs.

In this connection, the control of the preheating temperature and of the evaporating pressure (the vacuum) may be carried out manually, which, however, is very labor-consuming. Consequently, it is preferred to carry out the method with the apparatus of the invention, whereby these controls are effected automatically. The new apparatus comprises temperature-sensitive means located in the pipe for conducting the preheated liquid to the steam-introducing device, said means being operable to control the supply of heating medium to the indirect preheater, so that the liquid is pre-heated to a constant temperature. A temperature-sensitive element is located in position to sense the temperature of the heat-treated liquid discharging from the expansion vessel or chamber, and this element coacts with the aforesaid temperature-sensitive means to control the pressure (the vacuum) in the expansion vessel, so that a constant difference is maintained between the temperature of the pre-heated liquid and the temperature of the discharging heat-treated liquid.

The present invention is described more in detail below, reference being made to the attached drawing in which the single illustration is a schematic view of a preferred form of the new apparatus.

The liquid which is to be heat-treated is continuously led through a heat exchanger 1, which may be of the plate type, where it is indirectly preheated by a heating medium which is admitted into the heat exchanger through an inlet 3 under control of a valve 3a. A temperature-sensitive element 4 is located in the pipe 2 for the preheated liquid. This element actuates valve 3a through a conventional control device 5 to control the supply of heating medium to the heat exchanger 1, so that the liquid is preheated to a constant temperature.

The liquid thus preheated to a constant temperature is pumped by means of a pump 6 through a device 7 in which the temperature of the liquid is rapidly increased to the intended value for the heat-treatment (the sterilization temperature) by direct injection of steam which is supplied to the device 7 by a steam pipe 8 and controlled by means of a valve 9 fitted in the steam pipe.

The heated liquid is led through a three-way valve 19, the purpose and operation of which are explained more in detail below, to an expansion vessel 10 in which the liquid is cooled under evaporation owing to a rapid pressure drop, the water content of the liquid being reduced at the same time. The expansion vessel 10 is exhausted by means of a vacuum pump 12, the suction side of which is connected to the expansion vessel by a pipe 11. The cooled liquid remaining after the evaporation is pumped by a pump 14 in the discharge pipe 13 from the expansion vessel 10 through a cooler 15 and drawn off, after possible further treatment, into sterile vessels or bottles (not shown).

A temperature-sensitive element 16 is located in the pipe 2 ahead of the device 7 for direct injection or mixing of steam. A temperature-sensitive element 18 is located in or beyond the expansion vessel 10 where it senses the temperature of the discharging heat-treated liquid. The elements 16 and 18 are operatively connected to and jointly control a conventional regulating device 17 which regulates a vacuum control valve 17a in pipe 11, to control the pressure (the vacuum) in the expansion vessel 10, whereby a constant temperature difference is maintained between the last-mentioned temperature-sensitive elements 16 and 18.

A temperature-sensitive element 20 is located in the pipe 2a between the device 7 and valve 19 and controls the latter, through a conventional actuator 21. If the liquid has not been heated to the predetermined temperature (as due to insufficient supply of steam to the injection device 7), the thermostatically controlled actuator 21 switches the previously mentioned three-way valve 19 from the position in which the liquid is led to the expansion vessel 10 to the position in which the liquid is led to another similar expansion vessel 22. A pump 24 returns the liquid through pipe lines 23 and 25 to the system, either through a pipe 26 ahead of the heat exchanger 1 or through a pipe 27 beyond said heat exchanger. The latter pipes have manual valves 26a and 27a, respectively. The expansion vessel 22 is also connected to the suction side of the vacuum pump 12 through vacuum pipes 11a and 11. A temperature-sensitive element 28 is located in or beyond the expansion vessel 22 and is operatively connected to the regulating device 17, this element having the same purpose and operating in the same way as the temperature-sensitive element 18.

After the temperature of the liquid has been increased to the predetermined value by injection of steam in the device 7, the three-way valve 19 is, owing to the action of the temperature-sensitive element 20 and the actuator 21, switched back to the position in which the liquid is led to the expansion vessel 10.

It will be understood that the elements 4 and 16 form temperature-sensitive means responsive to temperature changes of the preheated liquid flowing through pipe 2. Upon any such temperature change, the element 4 operates the control device or actuator 5 to adjust valve 3a so as to counteract such temperature change. The elements 16 and 18 and the regulator 17 form, in effect, means for comparing the liquid temperatures sensed by the elements 16 and 18 and operating the vacuum valve 17 to counteract any change in the predetermined difference between those temperatures. The elements 16, 18 and 28 are operatively connected to regulating device 17 through suitable connections 16a, 18a and 28a, respectively. The regulator 17 may be of the type known as "Taylor Fulscope Ratio Controller-152 RM-SIS 119A" sold by Taylor Instrument Companies, Rochester, New York; and the valve 17a may be of the type sold by Taylor Instrument Companies as "Vacuum Regulator-41 S 480," which is designed to receive the output from the ratio controller.

I claim:

1. Apparatus for heat-treating a liquid, which comprises a pre-heater, a device for introducing steam into the liquid, a vessel forming an expansion chamber, pipe means for conducting a confined stream of the liquid through the pre-heater and thence to the expansion chamber by way of said device, a liquid discharge line leading from said chamber, a suction line leading from said chamber for discharging vapor from the chamber to maintain a vacuum therein, a valve in said suction line for controlling the vacuum in said chamber, means for sensing the temperature of the liquid in said pipe means between the pre-heater and said device, an operative connection between said sensing means and pre-heater for controlling the pre-heater to pre-heat the liquid to a constant temperature, an element for sensing the temperature of the liquid discharging from the expansion chamber through said liquid discharge line, and a regulating device operatively connecting said sensing means and element to said valve for actuating the valve to counteract variations from a predetermined differential between said sensed temperatures.

2. Apparatus as defined in claim 1, in which said temperature-sensing means include a first sensing device operatively connected to the pre-heater through said operative connection, said sensing means also including a second sensing device operatively connected to the valve by said regulating device.

References Cited by the Examiner

UNITED STATES PATENTS

| | | | |
|---|---|---|---|
| 2,846,320 | 8/1958 | Wittiver | 99—251 X |
| 3,010,832 | 10/1961 | Dahlstedt | 165—66 X |
| 3,101,041 | 8/1963 | Hallstrom | 165—40 X |

FREDERICK L. MATTESON, JR., *Primary Examiner.*

CHARLES SUKALO, *Examiner.*

M. A. ANTONAKAS, *Assistant Examiner.*